Patented Nov. 3, 1942

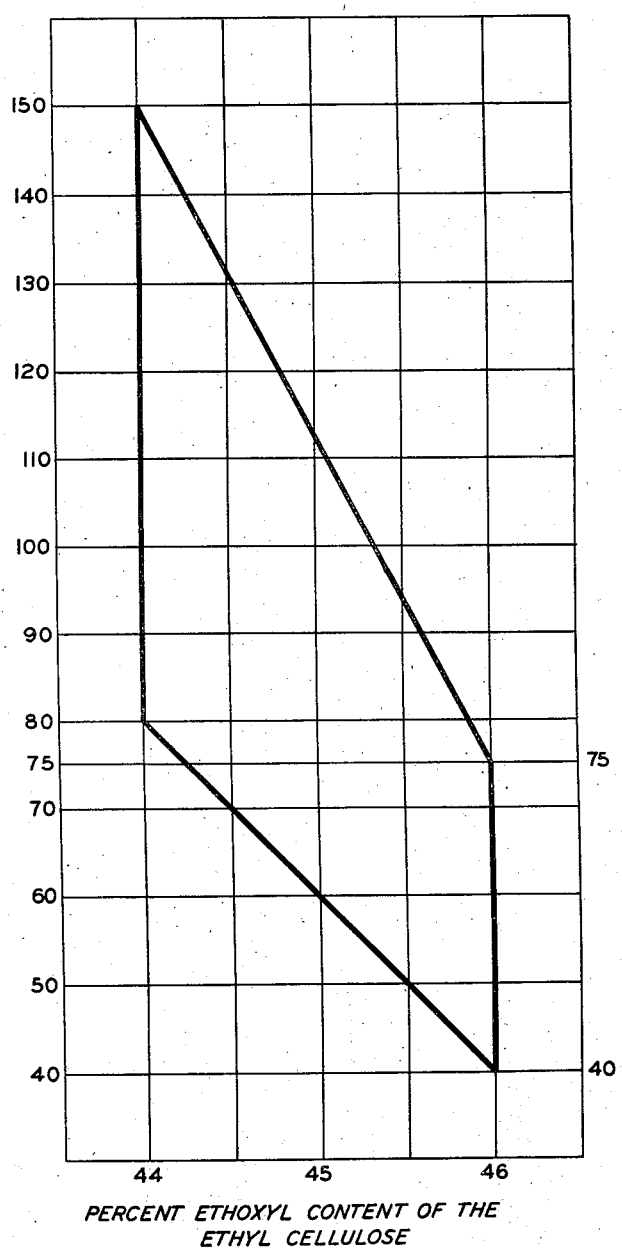

2,300,458

UNITED STATES PATENT OFFICE 2,300,458

ETHYL CELLULOSE MOLDED ARTICLE

Arthur P. Mazzucchelli, Bloomfield, N. J., assignor to Bakelite Corporation, New York, N. Y., a corporation of New Jersey Application August 3, 1940, Serial No. 350,294

2 Claims. (Cl. 106—197)

This invention relates to an improved ethyl cellulose thermoplastic molding material.

In general, use of ethyl cellulose as a molding material is well-known. It belongs to the group of permanently thermoplastic molding materials, and it appears to soften at the lowest temperature and to have its maximum flow when the ethoxyl content is about 47.2%. If the ethoxyl content is lower or higher than 47.2%, the molding material requires a higher heat to reach a plasticity and flow equivalent to the 47.2% ethoxyl content material. Furthermore, it so happens that, with ethyl cellulose, the maximum tensile strength of an article molded therefrom is obtained when the ethoxyl content is 47.2%, and it also so happens that if the piece is made from an ethyl cellulose which has a viscosity of 50 centipoises (measured at 25° C. in a 5% solution of an ethyl cellulose in a solvent of 80% toluene and 20% ethanol), the tensile strength is at a maximum and the molding properties are optimum.

However, if one molds an ethyl cellulose having a 47.2% ethoxyl content and a viscosity of 50, the surface of the molded piece has the inherent tendency to develop a surface fiber or fuzz when rubbed. This is sometimes spoken of as a surface lamination and has proved to be a serious detriment in the use of ethyl cellulose for plastic molding. The presence of the fuzz causes the moldings to lose gloss and develop a poor appearance after any use or handling which will cause rubbing of the surface. Furthermore, the surface lamination and development of the fuzz has made it impractical to use the ethyl cellulose for molding such articles as combs and the like where drawing the comb through the hair has produced the fuzz which has caused the surface of the teeth to become so rough or coarse that it has been impossible to use the comb after a short time.

I have discovered that there is a relation between the ethoxyl content and the viscosity of the ethyl cellulose (as determined in the previously described solution) used for moldings which, if adhered to, prevents the surface lamination of a molded article. The surface of the article will retain its gloss and excellent appearance and will make possible the production of articles, for instance combs, which are not unusable after a short period of time.

In order to obtain these results, the ethyl cellulose which is used for molding should have an ethoxyl content ranging between 44% and 46% with a viscosity ranging between 40 centipoises and 75 centipoises for the ethyl cellulose having an ethoxyl content of 46%, and a viscosity ranging between 80 centipoises and 150 centipoises for an ethyl cellulose having an ethoxyl content of 44%. For ethyl celluloses having ethoxyl contents between 44% and 46%, the viscosity range will be in proportion, that is for an ethyl cellulose having an ethoxyl content of 45%, the viscosity range will be between substantially 60 centipoises and 112.5 centipoises as is indicated on the attached drawing showing the ranges and relation of viscosity for the varying ethoxyl contents of the ethyl cellulose. This relation of variables may be expressed by stating that the viscosity (V) varies between $20(48-E)$ and $37.5(48-E)$ where E is the ethoxyl percentage between 44% and 46% in the ethyl cellulose. The viscosities referred to are determined in the 5% solution as stated above on a Saybolt viscometer.

The molding temperatures of the ethyl cellulose having the ethoxyl range of between 44% and 46% are from about 149° C. to 246° C. for suitably plasticized molding mixtures. These temperatures are about 15° C. to 30° C. above the molding temperature of a molding composition having the same proportions of the same plasticizers but based on an ethyl cellulose having a 47.2% ethoxyl content and a viscosity of 50 centipoises. However, although a higher molding temperature may be required for molding the ethyl cellulose of 44% to 46% ethoxyl content, the resulting molded pieces will have a higher distortion temperature and show much less surface change when brought into contact with boiling water, that is the strain-release temperature of the moldings is higher than for the 47.2% ethoxyl ethyl cellulose. But the ethyl cellulose having an ethoxyl content ranging between 44% and 46% will tolerate a larger amount of plasticizer than will an ethyl cellulose having an ethoxyl content of 47.2% without excessive reduction of its distortion temperature, and therefore the molding temperatures of the ethyl celluloses having an ethoxyl content between 44% and 46% may, if desired, be brought down to or lower than the molding temperature of a molding composition having a 47.2% ethoxyl content. The improvement in surface obtained by the application of the present invention is most pronounced when the ethyl cellulose is used for extrusion or injection molding, as this type of molding appears to break up the granules or aggregates of the ethyl cellulose when the ethoxyl content of the latter is about 47.2%. In order further to illustrate the subject matter of the invention but without the intent to limit the scope of the invention, reference may be had to the following examples:

Example 1.—Seventy-eight and seven tenths parts by weight of ethyl cellulose having an ethoxyl content of 44.6% and a centipoise viscosity of 104, 12.3 parts of gum dammar, 7.4 parts of mineral oil, and 1.6 parts of japan wax as mold lubricant, are thoroughly compounded in a Banbury mixer for fifteen minutes at from 66° C. to 149° C. until homogeneous, then the mixture is sheeted on hot rolls. This sheet is allowed to cool when it may conveniently be cut into smaller parts, convenient for grinding. Particles which will pass through an 8 to 10 mesh screen are suitable for feeding into the heating chamber of an injection molding machine although particles having a size running from 4 mesh to 30 mesh may be used. The powder may then preferably be preheated for about one hour at 82° C. before molding.

The resultant molding material can be molded satisfactorily at from 177° C. to 232° C. in a standard injection molding machine using pressures as low as 10,000 lbs. per square inch. The moldings are free from surface lamination or fuzzing when rubbed. Also the material does not tend to burn in the cylinders of the injection molding machine at this temperature and there is no discoloration or streaking which, if present, makes the molded objects unsatisfactory.

A granulated molding material made as described above has good moldability, is clear and transparent (unless pigments, fillers or the like are introduced to give translucent or opaque effects) and the mechanical properties are substantially as good as though an ethyl cellulose having a 47% ethoxyl content had been used.

Example 2.—Seventy-seven parts of pulverized ethyl cellulose having an ethoxyl content of 44.7% and a viscosity of 68.4 centipoises, 15 parts of di-(ortho xenyl) mono-phenyl phosphate, 5 parts of tri-(para tert.-butyl phenyl) phosphate and 3 parts of stearic acid as mold lubricant are mixed thoroughly, then compounded for 30 minutes on rolls having a temperature of from 104° C. to 177° C. until a homogeneous sheet is obtained. This sheet is allowed to cool and then is cut into suitable strips or pieces convenient for grinding. The ground material can then be molded in a standard injection molding machine at from 166° C. to 188° C. The moldings are free from surface laminations or fuzz when rubbed.

Example 3.—One hundred parts of ethyl cellulose having an ethoxyl content of 44.0% and a viscosity of 125 centipoises, 24.2 parts of dibutyl phthalate plasticizer, and 1.5 parts of stearic acid as mold lubricant are compounded in a Banbury mixer for twenty minutes at 115° C. until homogeneous. The plastic mass is then sheeted on hot rolls. The sheets are allowed to cool, then cut up into strips or pieces and ground to about 8 mesh. The molding powder is then molded, with or without preheating, at 177° C. to 210° C. in a standard injection molding machine using pressures as low as 10,000 lbs. per square inch.

Example 4.—One hundred parts of pulverized ethyl cellulose having an ethoxy content of 46% and a viscosity of 45 centipoises, 15 parts of di-(ortho xenyl) mono-phenyl phosphate, 5 parts of tri-(para tert. butyl phenyl) phosphate, and 3 parts of stearic acid as mold lubricant are mixed thoroughly and rolled at from 104° C. to 177° C. until a homogeneous sheet is obtained. The sheet is allowed to cool and is then cut up into pieces and ground to 8 mesh. The powder is then molded in a standard injection molding machine at from 143° C. to 160° C. using pressures as low as 15,000 lbs. per square inch.

Practically all standard plasticizers are compatible with this variety of ethyl cellulose, but the most useful ones which can be substituted for the foregoing appear to be various phthalates and sulfonamides, aryl phosphates, hydrogenated methyl abietate, hydrogenated rosin and hydrogenated tertiary amyl phenol, hydrogenated tertiary butyl phenol and para-phenyl phenol aldehyde resins. Particularly satisfactory are combinations of brittle resins such as gum dammar or hydrogenated ester gum with liquid plasticizers, such as mineral oil or methyl phthalyl ethyl glycollate. These plasticizers can be used alone or together in quantities varying from 10% to 35% of the weight of the molding material. The upper limit of the amount of plasticizer is approximately 35% for celluloses having an ethoxyl content between 44% and 46%, as too much plasticizer lowers the rigidity of the molded piece and lowers its distortion temperature. However, using ethyl cellulose having an ethoxyl content between 44% and 46%, the upper limit of plasticizer (about 35%) does not result in a great drop in distortion temperature because this type of ethyl cellulose has a higher intrinsic softening point and therefore can tolerate a greater quantity of the plasticizer than can the ethyl cellulose of 47.2% ethoxyl content.

If the types of ethyl cellulose are used according to this invention, the molded materials will not only be substantially free from surface lamination but they will have a better gloss and more resistance to surface change and distortion after five minutes immersion in boiling water, than if an ethyl cellulose having a 47.2% ethoxyl content and a 50 centipoise viscosity were used.

I claim:

1. Molded article comprising ethyl cellulose having an ethoxyl content between about 44% and 46% and having a viscosity, determined as described herein, of from 20 to 37.5 times the number by which the ethoxyl percentage is less than 48, the surface of the article being substantially free from a tendency to laminate under friction.

2. Molded article comprising ethyl cellulose and a plasticizer therefor, the ethyl cellulose having an ethoxyl content between about 44% and 46% and having a viscosity, determined as described herein, of from 20 to 37.5 times the number by which the ethoxyl percentage is less than 48, the amount of plasticizer being between substantially 10% and 35% of the weight of the molded article, the surface of the article being substantially free from a tendency to laminate under friction.

ARTHUR P. MAZZUCCHELLI.